April 25, 1961  J. M. KENNEL ET AL  2,981,184
EDDY CURRENT DETECTOR
Filed July 16, 1952
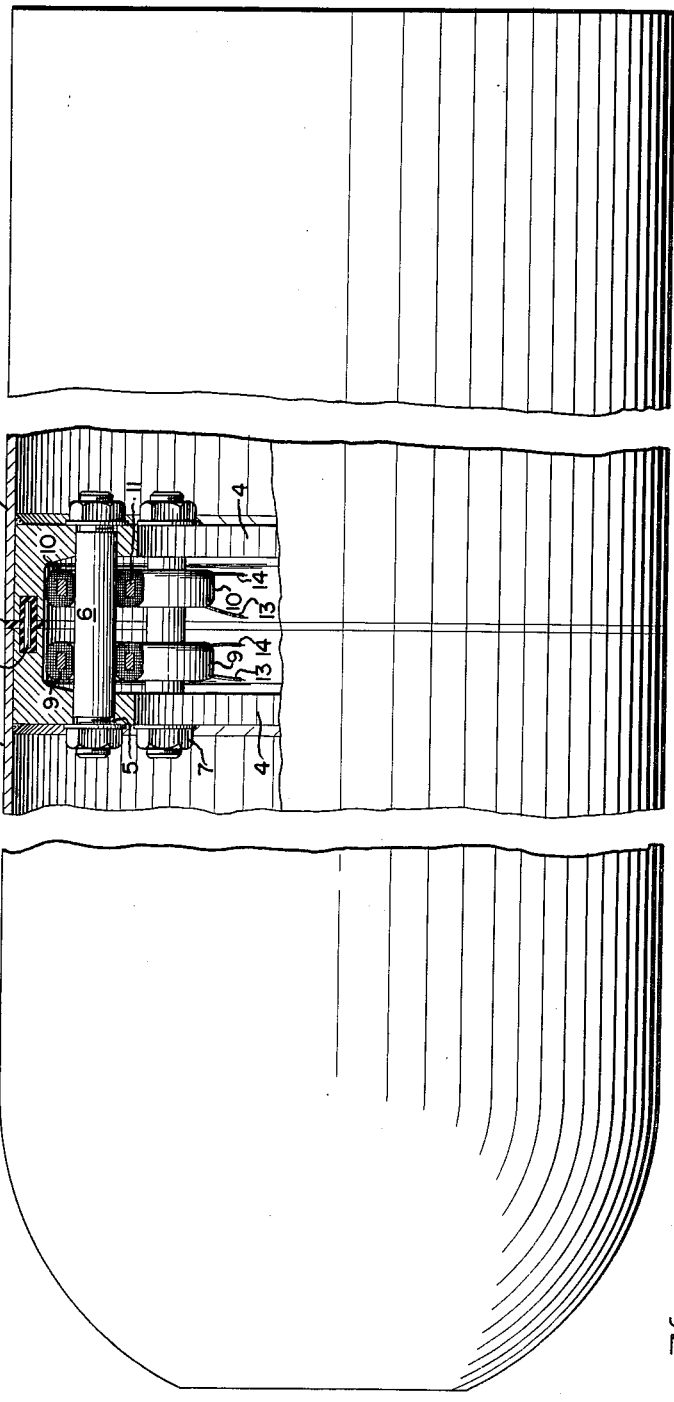
INVENTORS
JOHN M. KENNEL
MYRON MILLER
BY
ATTORNEYS

United States Patent Office 2,981,184
Patented Apr. 25, 1961

2,981,184

EDDY CURRENT DETECTOR

John M. Kennel, P.O. Box 63, Downey, Calif., and Myron Miller, 2919 Wilton Ave., Silver Spring, Md.

Filed July 16, 1952, Ser. No. 299,325

5 Claims. (Cl. 102—18)

(Granted under Title 35, U.S. Code (1952), sec. 266)

The invention described herein may be manufactured and used by or for the Government of the United States of America for governmental purposes without the payment of any royalties thereon or therefor.

This invention relates to detectors and more particularly to an alternating magnetic field detector which may be used in underwater ordnance devices.

The embodiment herein disclosed is an improvement over the structures shown in copending application, Serial Number 295,142, filed June 23, 1952, by Donald F. Ream.

Galvanic action between a conducting vessel and sea water generates an underwater electric potential which causes a current to flow in the circuit formed by the vessel and the sea water. Operation of the vessel causes variations in this current above and below a normal value which in turn produces an alternating magnetic field associated with the vessel. This alternating magnetic field induces eddy currents in the sea water and in metallic cases such as used for underwater ordnance equipment. Currents due to the electric vector component of the alternating electromagnetic wave radiated by the vessel also flow in metallic underwater ordnance cases and produce eddy currents in the sea water and metallic ordnance cases. The instant invention is concerned with detecting the eddy currents which flow in the metallic underwater ordnance cases and utilizing them to energize firing circuits in such underwater ordnance devices or other circuits which may be energized by potentials induced by such currents, such as for measurement purposes.

The presence of such currents have heretofore prevented the location of search coils internally of a metallic ordnance case because of the shielding effect on the search coil by eddy currents flowing in the ordnance case. The old method involved either the use of a search coil inside a plastic or high resistivity metallic ordnance case or a search coil external to a low resistivity metallic ordnance case, neither of which arrangements is satisfactory so far as production or ordnance applications is concerned.

The instant invention concerns a novel arrangement of a plurality of toroidally wound coils supported on short conducting members mounted internally of the ordnance case for detecting eddy currents flowing in the ordnance case due to the alternating magnetic fields of vessels passing in the vicinity of the ordnance case and utilizing such currents for energizing a firing circuit for the ordnance device or for measurement purposes.

It is a primary object of the present invention to provide an ordnance device having a search coil associated therewith, which search coil is incorporated within, and is a part of, the ordnance case.

It is a further object of the present invention to utilize the eddy currents induced in an ordnance case by a passing vessel to energize the firing circuit of the ordnance device.

It is a further object of the present invention to provide a detecting device for use in conjunction with an underwater ordnance device utilizing toroidal coils which permit high effective core permeabilities to detect induced eddy currents flowing in the case.

It is a further object of the present invention to provide a mounting having good mechanical stability for a search coil which may be incorporated within an underwater ordnance case.

It is a further object of the present invention to provide an ordnance device having a detector associated therewith which is frequency selective.

It is a further object of the present invention to provide a detector associated with an ordnance case which may be efficiently produced, handled, stored, tested, maintained and arranged to provide greater safety than heretofore possible due to separation of the explosive and mechanism chambers of the underwater ordnance device.

Other objects and many attendant advantages of this invention will be readily appreciated as the same becomes better understood by reference to the following detailed description when considered in connection with the accompanying drawing wherein:

The figure is a view partly in section showing the manner of mounting the detector coils within an ordnance casing in one embodiment of the invention.

In order to accomplish the objects of the present invention there is shown in the figure an ordnance casing shown generally by 1 consisting of two portions 2 and 3. The portion 2 of the ordnance casing may contain the explosive charge and the portion 3 may contain the buoyancy and mechanism chamber. Each of the portions 2 and 3 of the casing are provided with internal ribs 4 located adjacent the juncture of the two halves. Each of the reinforcing ribs 4 is provided with a series of equally radially spaced apertures 5 which are arranged to be in registry when the two halves 2 and 3 are joined. A plurality of short conducting members 6 are inserted in the registering apertures 5. The members 6 are provided with threads at each end permitting the two halves of the casing to be joined by tightening the nuts 7, a suitable handhole being provided for this purpose. Prior to insertion of the members 6 through the apertures 5 a plurality of toroidal coils 9 and 10, wound upon annular laminated structures 11, are arranged to encircle these members. In order to insure that the eddy currents induced in the ordnance case will flow through the conducting members 6 an insulating and sealing gasket 12 is inserted between the halves 2 and 3. The studs 8, suitably insulated, are provided to facilitate aligning the two halves when they are being joined. The coils 9 and 10 are shown as being arranged one on each side of the insulating gasket 12 but it will be understood that other arrangements may also be used, for example, a plurality of coils may be placed on either side of the insulating member 12 or a single coil may be used. The alternating magnetic field produced by a vessel passing in the vicinity of the ordnance device induces eddy currents in the casing composed of the portions 2 and 3. Since these portions are electrically coupled by members 6, the eddy currents will flow from the portion 2 to the portion 3 by means of the conducting members 6. The path of the eddy current flow between the portions of the casing in the assembled condition will be through the ribs 4 and conducting members 6. The members therefore serve not only as mechanical coupling for the parts 2 and 3 but also provide an electrical path for the eddy currents flowing in the casing. The conducting members 6 are further utilized as the primary winding of transformers of which the secondary windings are the toroidal coils 9 and 10. The voltages of the toroidal coils 9 and 10 which may be connected additively are connected to the firing circuit [not shown] of the ordnance device by means of leads 13 and 14. Each of the secondaries 9 and 10 of the transformers may be frequency selective.

The objects of the instant invention are thus accomplished by the provision of a detector for energizing the firing circuit of an underwater ordnance device or for measuring purposes, which is associated with, and forms a portion of, the casing of such device. The detector depends for its operation on eddy currents induced in the casing which formerly prevented the mounting of detector coils within a metallic ordnance case.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An underwater ordnance detecting system responsive to underwater electric currents comprising a conducting casing divided into a plurality of chambers, insulating means contacting said chambers at abutting junctures thereof, conducting means connecting said chambers in abutting watertight relation, support means for mounting said conducting means, said support means being secured internally adjacent the abutting junctures of said chambers to permit said chambers being connected in abutting face relation and separated by said insulating means, said support means having equally radially spaced apertures, insulated guide means for locating said chambers in registering relation, a plurality of toroidal detecting coils wound on annular laminated structures and encircling said conducting means, in a manner whereby said coils detect eddy currents circulating in said casing and flowing through said conducting means contemperaneously with the passing of a vessel in the vicinity of said device and thus induce a potential in said coils.

2. A device as recited in claim 1 wherein said conducting means provides short conducting paths between the chambers of said ordnance device.

3. In combination with an underwater ordnance device including a casing having a plurality of chambers and of a character incorporating a firing circuit therein, detecting means arranged internally of said casing sensitive to eddy currents circulating in said casing, conducting means cooperating with said detecting means for connecting said chambers in abutting watertight relation, insulating means contacting the abutting junctures of said chambers, support means for said conducting means secured internally to said casing, alignment members insulatedly mounted in said support means for bringing said chambers into registering relation, said detecting means including a plurality of toroidal coils wound on annular laminated structures encircling said conducting means whereby eddy currents circulating in said casing flow through said conducting means and induce potentials in said coils.

4. A detecting system responsive to underwater electric currents comprising a conducting casing having a plurality of chambers open at one end, toroidal frequency selective coils wound on annular laminated structures, conducting cores encircled by said coils arranged internally of said casing and connecting said chambers in abutting registering relation at said open ends, support means for said cores fixedly secured internally of said chambers adjacent the open ends thereof, insulating means contacting the abutting junctures of said chambers whereby currents flowing in said casing flow through said cores and induce a potential in said coils.

5. An underwater ordnance detecting device comprising a two-section casing, insulating means separating the sections of said casing at the junctures thereof, detecting means responsive to eddy currents flowing in said casing mounted internally of the casing, said detecting means including a plurality of toroidal coils wound on annular laminated structures, conducting cores encircled by said coils arranged internally of said casing and connecting the sections thereof at said junctures whereby currents flowing in the casing flow through said cores and induce a potential in said coils.

References Cited in the file of this patent
FOREIGN PATENTS 803,907    France _____ July 20, 1936